United States Patent
Huang et al.

(10) Patent No.: US 12,078,532 B2
(45) Date of Patent: Sep. 3, 2024

(54) INFRARED ALIGNMENT MARKER FOR DISPLAY ASSEMBLY

(71) Applicant: Dell Products L.P., Round Rock, TX (US)

(72) Inventors: Hong-Ji Huang, Xinyi District (TW); Yu-Chen Liu, Hsinchu (TW); Kuo-Wei Tseng, Zhongzheng District (TW); Chun-Wei Huang, East District (TW); Chi-Fong Lee, Taoyuan (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/962,050

(22) Filed: Oct. 7, 2022

(65) Prior Publication Data
US 2024/0118135 A1  Apr. 11, 2024

(51) Int. Cl.
*G01J 1/04* (2006.01)

(52) U.S. Cl.
CPC ........... *G01J 1/0488* (2013.01); *G01J 1/0411* (2013.01)

(58) Field of Classification Search
CPC .............................. G01J 1/0488; G01J 1/0411
USPC .................................................. 250/226, 239
See application file for complete search history.

(56) References Cited

U.S. PATENT DOCUMENTS

| | | | |
|---|---|---|---|
| 8,937,805 B2 | 1/2015 | Cheng et al. | |
| 10,353,432 B2 * | 7/2019 | Mathew | H05K 5/0017 |
| 10,816,851 B2 | 10/2020 | Kim et al. | |
| 2013/0258234 A1 * | 10/2013 | Park | G02F 1/133528 349/58 |
| 2018/0067212 A1 * | 3/2018 | Wilson | H04M 1/02 |
| 2018/0321779 A1 | 11/2018 | Huang | |
| 2021/0223877 A1 * | 7/2021 | Wang | G06F 3/0445 |
| 2022/0100227 A1 | 3/2022 | Schwager et al. | |
| 2022/0129033 A1 | 4/2022 | Schwager et al. | |

* cited by examiner

*Primary Examiner* — Thanh Luu
*Assistant Examiner* — Mai Thi Ngoc Tran
(74) *Attorney, Agent, or Firm* — Larson Newman, LLP

(57) ABSTRACT

An information handling system includes a display panel having an active area that generates visual images and an inactive area disposed outside the active area. The inactive area having an alignment mark that is invisible to a naked eye.

20 Claims, 4 Drawing Sheets

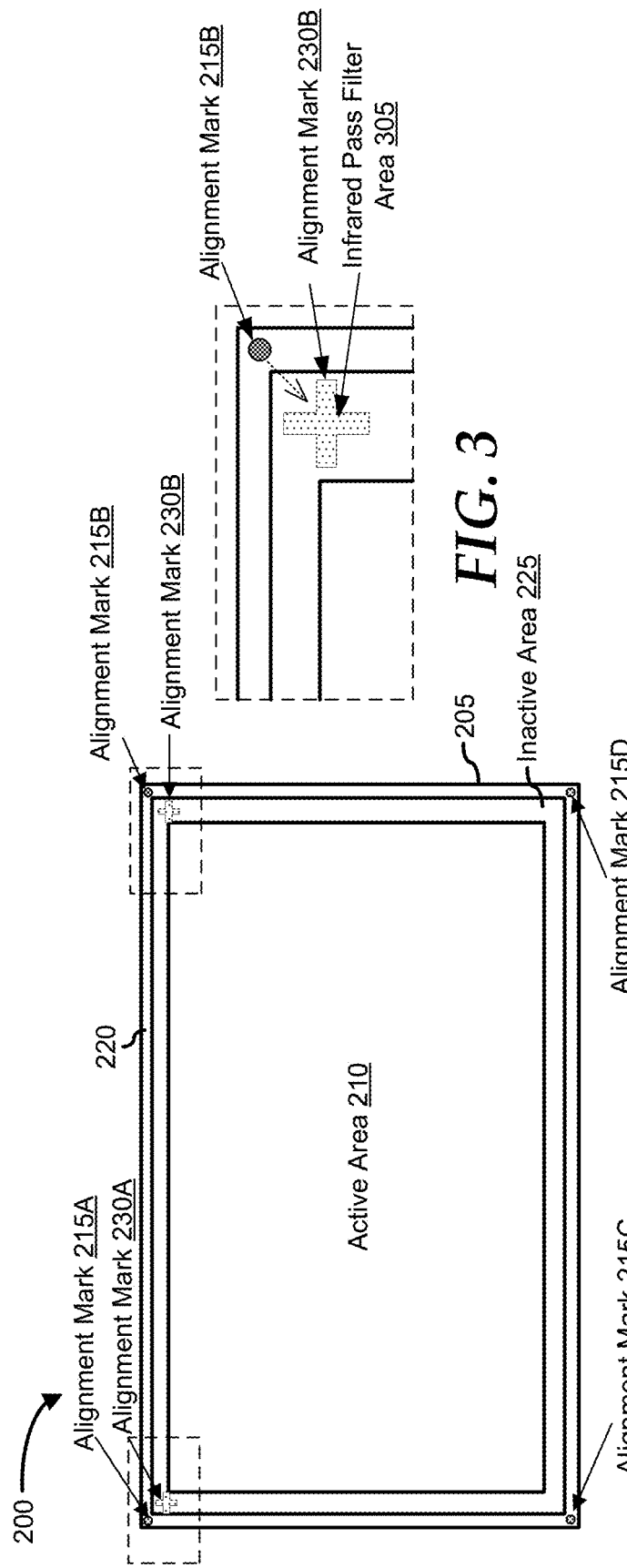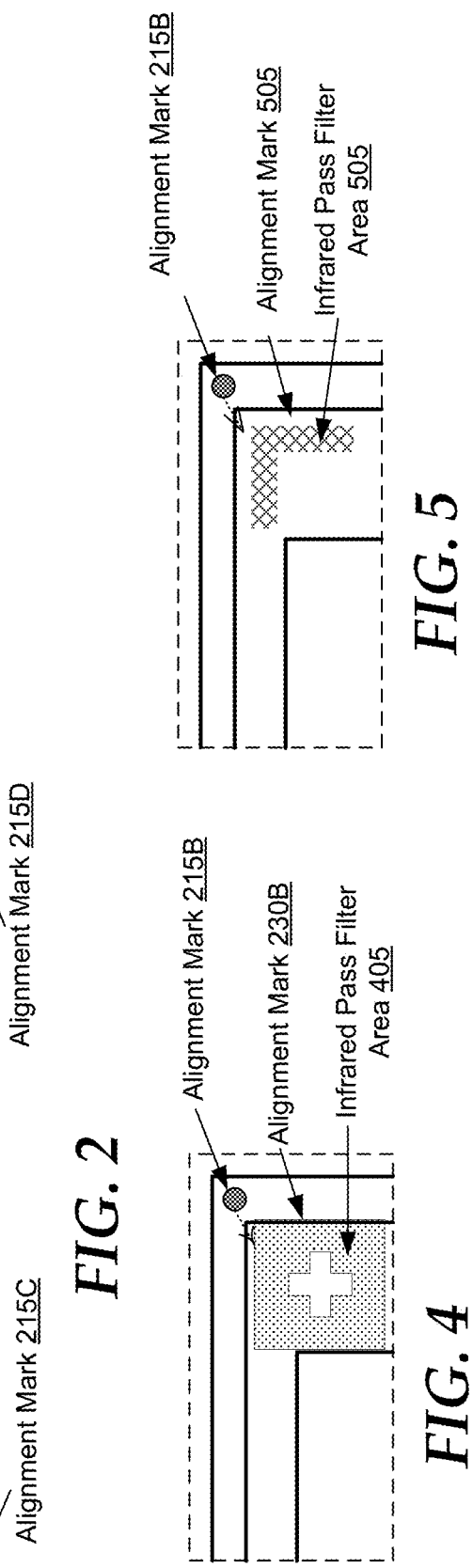

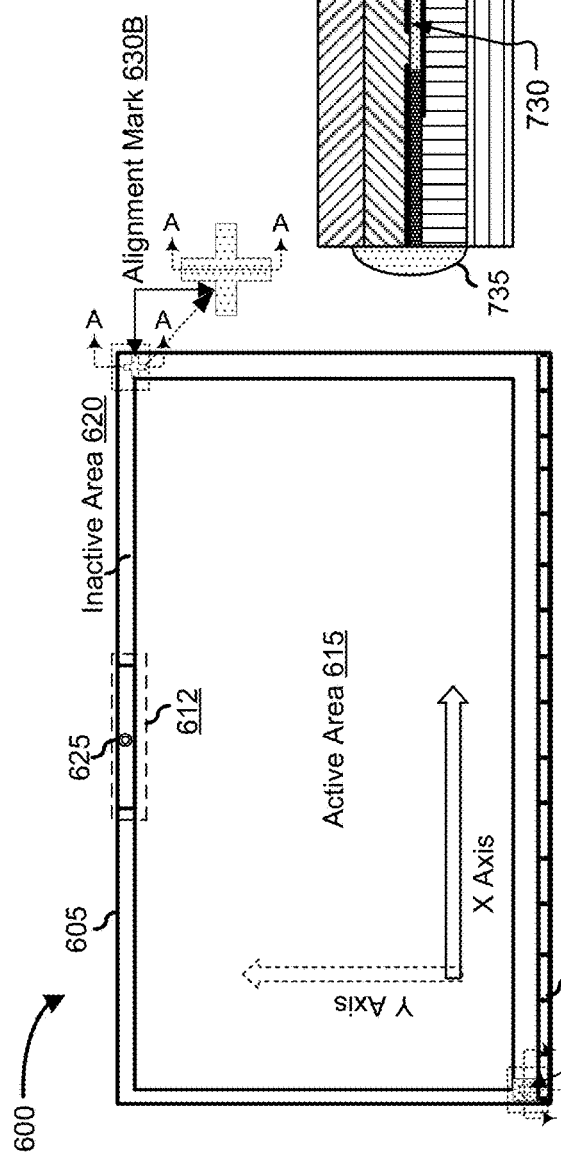
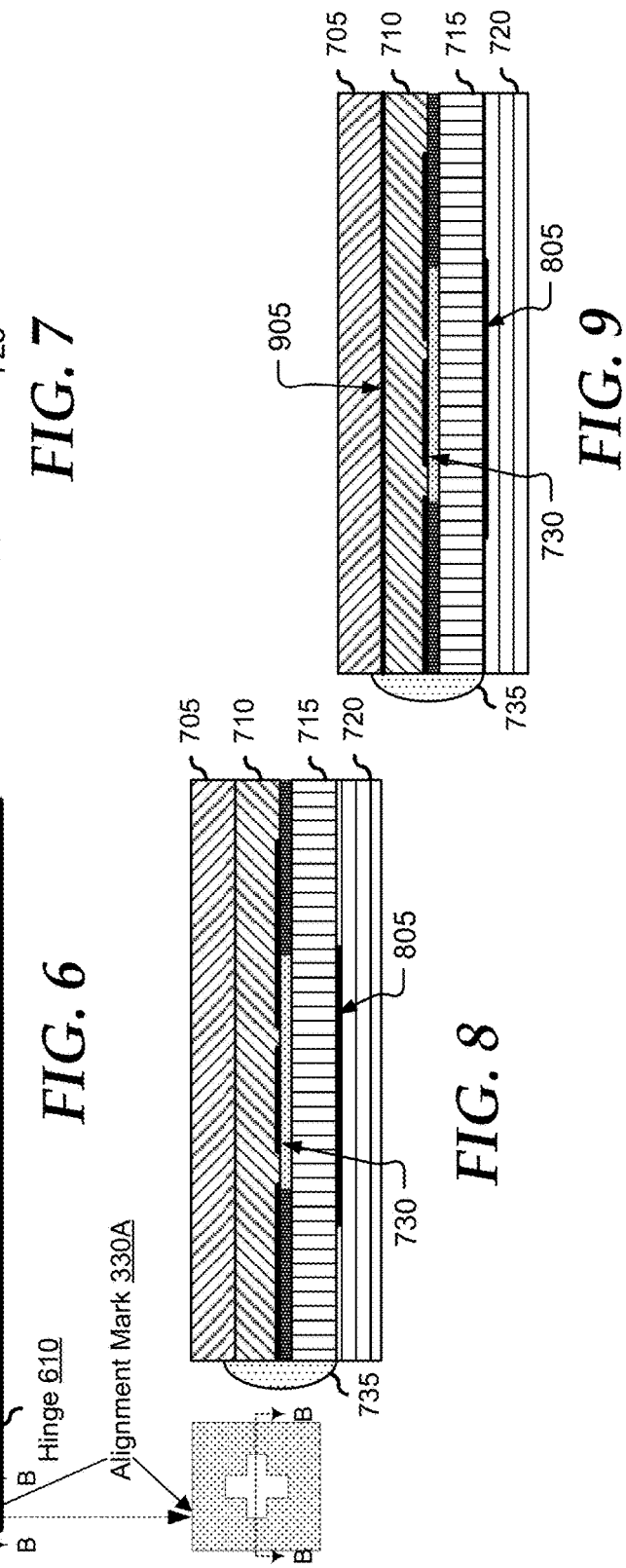

INFRARED ALIGNMENT MARKER FOR DISPLAY ASSEMBLY

FIELD OF THE DISCLOSURE

The present disclosure generally relates to information handling systems, and more particularly relates to improving alignment marking for edge-to-edge display assembly.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A display panel has an active area that generates visual images and an inactive area disposed outside the active area. The inactive area has an alignment mark that is invisible to a naked eye.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 2 is a diagram illustrating a display module, according to an embodiment of the present disclosure;

FIG. 3 is a diagram illustrating a detail view of an alignment mark, according to an embodiment of the present disclosure;

FIG. 4 is a diagram illustrating a detail view of an alignment mark, according to an embodiment of the present disclosure;

FIG. 5 is a diagram illustrating a detail view of an alignment mark, according to an embodiment of the present disclosure;

FIG. 6 is a diagram illustrating a display module, according to an embodiment of the present disclosure;

FIG. 7 is a diagram illustrating a side sectional view of a display panel, according to an embodiment of the present disclosure;

FIG. 8 is a diagram illustrating a side sectional view of a display panel, according to an embodiment of the present disclosure;

FIG. 9 is a diagram illustrating a side sectional view of a display panel, according to an embodiment of the present disclosure;

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
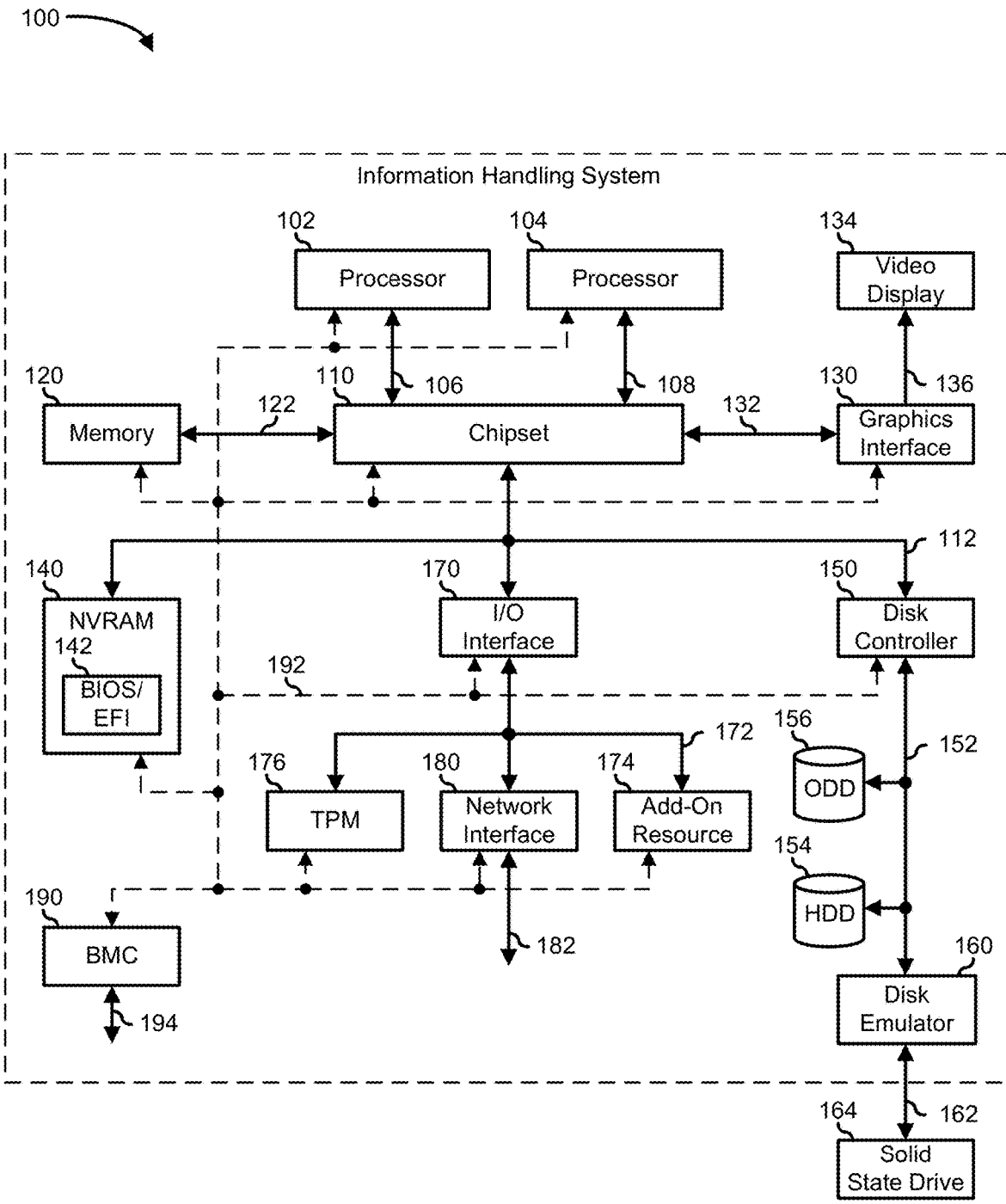
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a double data rate (DDR) memory channel and memory 120 represents one or more DDR dual in-line memory modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as dynamic random access memory (DRAM) DIMMs, static random access memory (SRAM) DIMMs, non-volatile DIMMs (NV-DIMMs), storage class memory devices, read-only memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (×4) PCIe adapter, an eight-lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on a separate circuit board or an add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular-based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out-of-band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purposes of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

The length and width of a portable information handling system are influenced by the footprint of the display, such as video display 134 of FIG. 1. End users tend to prefer larger displays. Accordingly, edge-to-edge front-of-screen glass is typically the consumer-preferred look for the display of portable information handling systems. This also means that the border width of a bezel around the display is limited. During manufacturing, the position of the display device or screen may be sensed by a charged-couple device (CCD) camera.

To sense the precise position of the display device, the CCD camera may look for an alignment mark. Typically, the alignment mark is placed on the border instead of the active area of the display device. As the border of the display device gets thinner to accommodate the bigger active area as preferred by consumers, the location of the alignment marks is becoming more restricted. As such, instead of typically using three alignment marks to define the X-Y axis for precise dimension control, there may have only space for two alignment marks. This means that the manufacturer can only control either the X or the Y axis precisely. The other axis may have to rely on a distance from the mark associated with the controlled X or Y axis.

However the greater the distance from that alignment mark, the larger the tolerance. Accordingly, the tolerance gets larger as the size of the display gets bigger. As such, the tolerance difference between the X and Y axis will be more when the display size gets bigger. In addition because the active area of the display is also bigger, the alignment marks should not obstruct the edge-to-edge appearance of the display device nor should they obstruct components of the information handling system, such as a camera that is typically placed on the top edge of the display device. To address these and other issues, the present disclosure provides an invisible alignment mark for edge-to-edge display assembly.

FIG. 2 shows a display device 200 of an information handling system configured with traditional and invisible alignment marks. Display device 200, which is similar to video display 134 of FIG. 1, includes a display panel 205 with an active area 210 and an inactive area 225. Display device 200 also includes a bezel that surrounds display panel 205. Active area 210 corresponds to a center region to display images, video content, and/or user interface components. Inactive area 225 is at the outer perimeter of display device 200 and has a black matrix appearance that limits light leakage from active area 210. In general, bezel 220 may provide structural support to the display components and/or may attach to a support structure housing the display device components. In some display devices, bezel 220 may be implemented with an electrically non-conductive, lightweight material, such as a plastic material that snaps into place.

Typically, the display panel is assembled into the housing, and then the perimeter of the display panel is protected by a bezel coupled to the housing perimeter and extending over the perimeter, similar to display panel 205 of FIG. 2. Typically, a set of alignment marks, such as alignment marks 215A-215D, are located along the bezel of the display device. In contrast, an edge-to-edge system, similar to display device 600 of FIG. 6 extends the display panel to the housing perimeter without having a bezel placed around the display panel's perimeter. Accordingly, the alignment marks 215A-215D can no longer be placed along the bezel. Thus, it is desirable to have these alignment marks on the inactive area of the display panel instead of on the bezel. In this example, alignment marks 230A and 230B may be located on inactive area 225 of display device 200. These alignment marks may be used as reference marks during the manufacture of display device 200 instead of alignment marks 215A-215D. In one example, alignment marks 230A and 230B can be added to inactive area 225 via the photolithography process.

However, due to design constraints display device 200 may be limited to two alignment marks, such as alignment marks 230A and 230B. These alignment marks can be leveraged during the manufacture and assembly of the display device as these marks can be detected by infrared range sensors. Because these alignment marks, also referred to herein as reference marks, may be infrared markers and only reflect infrared wavelengths these alignment marks cannot be seen by a human eye. Accordingly, additional reference marks can be added to the display panel without interfering with the design of display device 200. For example, the additional reference marks may be used as references for other features such as orientation compensation, distortion detection, and camera module assembly. Doing so may eliminate the need for guiding plates. As such, a more compact design for the display can be achieved.

FIG. 3 shows a detail view of alignment mark 230B that may be placed at inactive area 225 of the display module. Alignment marks 230A and 230B may be placed on inactive area 225 using a photolithography process. Because alignment marks 230A and 230B have different transmittance in visible light range and infrared range, the reference marks cannot be seen by the human eye, but they can be detected by infrared range sensors. Accordingly, alignment marks 230A and 230B can be used during the manufacture of the display module. For example, alignment marks 230A and 230B may be used as alignment guides during the assembly of the display device.

FIG. 4 shows a detail view of alignment mark 230A. In this example, infrared pass filter area 405 is different from infrared pass filter area 305 of FIG. 3. As depicted, the shape of the reference marks may be manipulated and/or changed as shown in FIGS. 2, 3, 4, and 5. For example, a black matrix may be laid out according to a pattern, such as may include gaps or opening that allows ambient or visible light to pass through. In addition, the shape of the alignment and/or reference marks may be based on how the infrared pass filter material is leveraged as shown by the difference in infrared pass filter area 305 in FIG. 3 versus the infrared pass filter area 405 of FIG. 4, and an infrared pass filter area 510 of FIG. 5.

FIG. 5 shows an example of alignment mark 505 that has a different shape than alignment marks 230A and 230B. In addition, infrared pass filter area 510 of alignment mark 505 has a different shape from infrared pass filter area 305 of FIG. 3 and infrared pass filter area 405 of FIG. 4. The infrared pass filter material used for the infrared pass filter areas allows infrared illumination to pass through the display panel's field of view. For example, infrared pass filter areas 240 and 245 may have no black matrix or has a light-colored material with high transmittance of visible light like white. Accordingly, the area surrounding infrared pass filter areas 240 and 245 may have a black matrix wherein the visible light is blocked. As such, infrared pass filter areas 240 and 245 can hide the reference marks by eliminating the reflective and transmissive light.

FIG. 6 shows a display device 600 is configured with an invisible alignment mark. In this example, display device 600, which is similar to display device 200 of FIG. 2 may be an edge-to-edge display assembly of a portable information handling system, such as a 2-in-1 or ultrathin laptop. Accordingly, display device 600 may not have a bezel on its three sides in contrast to display device 200 of FIG. 2 which includes a bezel on four sides. Display device 600 includes a display panel 605 that may be attached to a hinge 610 via a bezel. Display panel 605 includes an active area 615 and an inactive area 620. Active area 615 is a central active area in which visual images are displayed. Inactive area 620 is an area around the perimeter of the display panel and aligned with the perimeter of an underlying housing. At the top side of display device 600, a sensor region 612 which includes an opening 325 that allows access to the underlying sensor, such as a red, green, blue (RGB) camera, infrared camera, time of flight sensor, ambient light sensor, etc.

Display panel 605 may be a liquid crystal display panel or similar that is coupled to a backlight and then assembled as a completed unit into a lid housing portion to provide an edge-to-edge display configuration. In one example, a portable information handling system has a main housing portion that is coupled to the lid housing portion by hinge 610. Hinge 610 may be a movable joint of metal or plastic that allows display device 600 to pivot around the body when opening or closing the information handling system. Display modules that are attached to a body of the information handling system in such a manner are called "hinge-up displays."

The display devices generally include a display panel to which a liquid crystal display screen and a display frame are attached. The display devices may also include a camera for videoconferencing, for example, a cabling system for power and data transfer as well as other components. Because the hinges are integrated into the display, the display and hinges can be aligned to the same alignment mark(s). For example, the alignment marks for hinge-up alignment with CCD during the manufacturing process. Further, because no guiding plate is required for the manufacture, a more compact design can be achieved. In addition, by leveraging the alignment marks as a reference, computer numerically controlled edge outline tolerance can be controlled with the same tolerance in both the X and Y axis. In one embodiment, the perimeter of the display module may be matched to the shape of the lid housing portion via the alignment marks 330A and 630B.

Alignment marks 330A and 630B may be designed using an infrared material that is invisible to the naked eye, also referred to as concealed printing. As such, the alignment marks may also be referred to as infrared markers. In addition, the arrangement of the layers of display panel 605 as depicted in FIG. 7, FIG. 8, and FIG. 9 allows the present disclosure to be designed according to the required or desired shapes of the alignment marks. For example, alignment marks 330A and 630B can be designed to meet the equipment alignment mechanism for both transmissive and reflective CCD alignments for display device 200 including hinge 610.

FIG. 7 depicts a side sectional view of display panel 605 taken along line A-A. In the example embodiment, display panel 605 includes a top polarizer 705, a color filter 710, a black matrix 730, a thin film transistor 715, an infrared filter 725, and a bottom polarizer 720. Top polarizer 705 may be coupled over thin film transistor 715, wherein top polarizer 705 may be exposed as an upper surface of display panel 605. Top polarizer 705 may have a cutout or opening at sensor region 612 of inactive area 620. Thin film transistor 715 may be operable to generate visual images in active area 615 and have a perimeter with inactive area 620.

Color filter 710 and thin film transistor 715 may both be glass substrates, wherein color filter 710 may be disposed under thin film transistor 715. Color filter 710 and thin film transistor 715 may be coupled to each other with a variety of types of resin, such as an optically clear adhesive, to achieve the desired illumination for the presentation of visual images at the upper surface of display panel 605. In contrast, inactive areas of display panel 605 may be coupled with other layers using an optically dense resin that forms a black matrix, also referred to herein as an opaque matrix, or an optically matched resin that passes through illumination as desired. Inactive area 225 at the outer perimeter of display device 600 may have a black matrix appearance that limits light leakage from active area 210 and aligns at an outer perimeter. Black matrix 730 disposed between thin film transistor 715 and color filter 710 and may be configured with a pattern that is adjusted according to the desired shape of the reference or alignment mark. Further, an edge ink 735, such as a black ink, coupled to the edge of display device 600 reduces leakage of illumination.

Top polarizer 705 may be disposed as an upper surface without a cover glass which reduces the thickness of display device 600. Top polarizer 705 is disposed over color filter 710 which may be a color filter glass substrate. Color filter 710 is disposed over thin film transistor 715 and a bottom polarizer 720. Black matrix 730 may be provided with a variety of different materials, such as black or other opaque ink, dark paint, dark tape, deposited material, etc. Black matrix 730 may be used between color filter 710 and thin film transistor 715 to improve contrast and prevent light leakage. A portion of black matrix 730 layer may be removed to form an opening, which can be used to design the look of the reference or alignment mark. For example, the opening may be used to pass images to the display panel.

Infrared filter 725 may be placed between color filter 710 and thin film transistor 715, such as over thin film transistor 715. Infrared filter 725 may be an infrared light highly reflective material that may be placed in the area or location of the reference marks. Because infrared filter 805 may reflect or block near-infrared wavelengths while passing visible light. For example, infrared filter 805 can hide the reference markers by eliminating reflective and transmissive light. This allows alignment marks 330A and 330 which are invisible to the human eye to be detected in the infrared light range. In addition, the placement of the infrared filter 425 may affect the shape of the reference mark. For example, the difference in shape between alignment marks 330A and 630B may be based in part on the location of the infrared filter.

Similar to FIG. 7, FIG. 8 depicts a side sectional view of display device 600 of FIG. 6 taken along a line B-B through display panel 605. In FIG. 8, infrared filter 805 may be placed underneath thin film transistor 715. In this example, the infrared pass filter area of alignment mark 330A may be a square around a cross similar to alignment mark 230B as shown in FIG. 8. In contrast, when infrared filter 425 is placed over thin film transistor 715, infrared pass filter area of alignment mark 630B (assuming openings of black matrix 730 are similar with regards to alignment marks 330A and 630B) is similar to alignment mark 230B as shown in FIG. 3.

Although alignment marks 330A and 630B are shown to include a black matrix process, in another embodiment, alignment marks 330A and 630B may be created using an infrared ink layer 905 on top of color filter 710, as depicted in FIG. 9. The infrared ink used in infrared ink layer 905 may be color matched to the color of the material used in black matrix 730. The infrared ink may be configured to transmit infrared rays and block visible light that can be applied to a glass substrate. In addition, the infrared ink may have transmissibility properties for sensors. The color of the infrared ink may also be such that it matches the surrounding area for a seamless design.

Figures 10, 11:
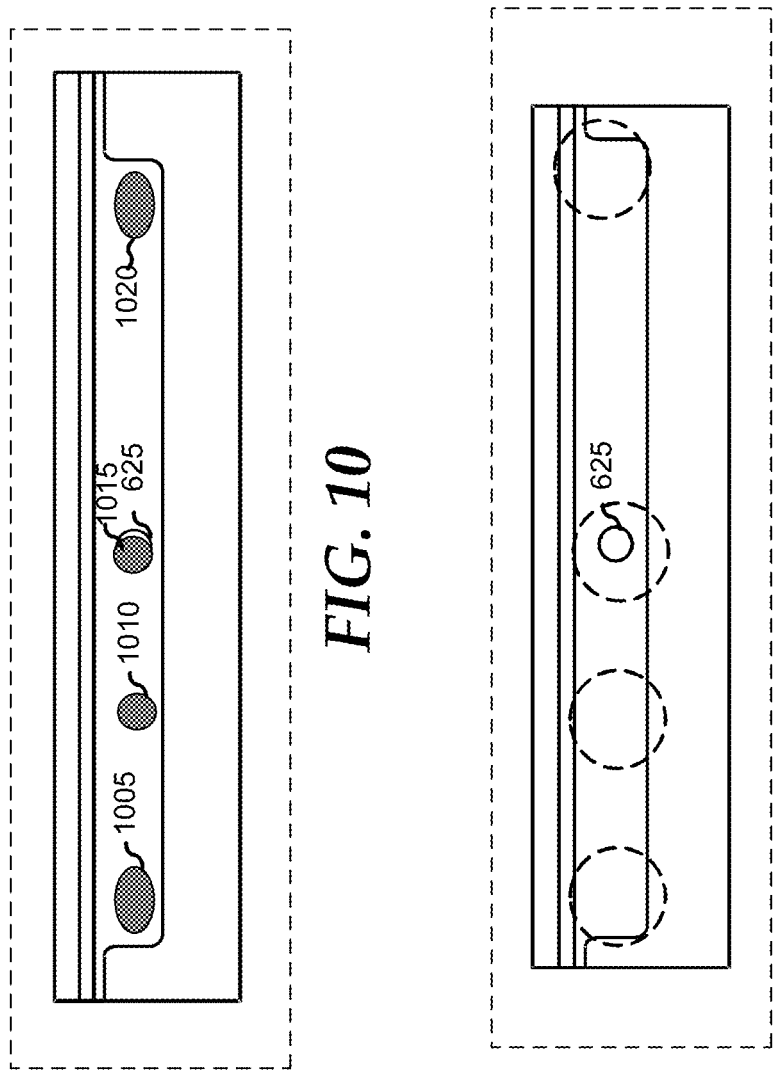
FIG. 10 is a diagram illustrating a detail view of a sensor region of a display module, according to an embodiment of the present disclosure.
FIG. 11 is a diagram illustrating a detail view of a sensor region of a display module, according to an embodiment of the present disclosure.

FIG. 10 shows a detail view of sensor region 612 with an opening 325 of FIG. 6. Opening 325 may be used for an RGB sensor, such as a web camera or other visual spectrum camera. In this example, reference marks 1005, 1010, 1015, and 1020 are depicted using traditional ink at various locations in sensor region 312. Because of the traditional ink used in the reference marks, the reference marks are visible to the naked eye and may partially obscure opening 625 affecting the functionality of the sensor utilizing that opening. In contrast, the aforementioned reference marks are depicted using infrared ink material that shields out invisible light but allows infrared light to pass which provides an invisible appearance in FIG. 11. In addition, the infrared ink material is disposed in alignment with an index matching resin to further filter illumination to the desired spectrum. As such, opening 625 may not be obscured by the reference mark which allows the sensor to be used as intended.

Those of ordinary skill in the art will appreciate that the configuration of the display modules and/or display panels depicted in the figures above may vary. For example, the illustrative layers of the display panels are not intended to be exhaustive but are representative to highlight components that can be utilized to implement aspects of the present disclosure. In addition, the components shown in the above figures are not drawn to scale and the display modules and/or display panels may include additional or fewer components and/or layers. Accordingly, although the display device is depicted herein as an integrated display of a portable information handling system, the display devices in the present disclosure may include a monitor that is integrated into the information handling system. However, the display devices also include display screens in smartphones or similar.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that causes a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. An information handling system, comprising:
a display panel having an active area that generates visual images and an inactive area disposed along a perimeter of the active area, the inactive area having an alignment mark that is invisible to a naked eye, wherein the display panel includes an infrared pass filter disposed between a color filter and a thin film transistor, wherein the infrared pass filter allows infrared illumination to pass through.

2. The information handling system of claim 1, wherein the alignment mark is designed to meet a manufacturing equipment alignment mechanism.

3. The information handling system of claim 1, wherein the display panel has an edge-to-edge configuration.

4. The information handling system of claim 1, wherein the display panel further comprises a polarizer upper surface coupled to the thin film transistor, the thin film transistor coupled over the color filter, an opaque matrix, and the infrared pass filter.

5. The information handling system of claim 4, wherein the infrared pass filter is disposed under the thin film transistor.

6. The information handling system of claim 4, wherein the infrared pass filter is disposed between the color filter and the thin film transistor.

7. The information handling system of claim 4, wherein the infrared pass filter can hide the alignment mark from the naked eye by eliminating reflective and transmissive light.

8. The information handling system of claim 4, wherein the opaque matrix includes a patterned opening that allows visible light to pass through.

9. A display module comprising:
a display panel having an active area that generates visual images and an inactive area disposed along a perimeter of the active area, the inactive area having an alignment mark that is created using an infrared ink layer on top of a color filter, wherein a first color of the infrared ink layer matches a second color of a black matrix, and wherein the display panel includes an infrared pass filter around the alignment mark.

10. The display module of claim 9, wherein the display panel further comprises a polarizer upper surface coupled to a thin film transistor, the thin film transistor coupled over the color filter, an opaque matrix, and the infrared pass filter.

11. The display module of claim 10, wherein the infrared pass filter is disposed under the thin film transistor.

12. The display module of claim 10, wherein the infrared pass filter is disposed between the color filter and the thin film transistor.

13. The display module of claim 10, wherein the infrared pass filter can eliminate reflective and transmissive light.

14. The display module of claim 9, wherein the display panel has an edge-to-edge configuration.

15. The display module of claim 10, wherein the opaque matrix includes a patterned opening that allows visible light to pass through.

16. A display panel, comprising:
a thin film transistor operable to generate visual images in an active area and having a perimeter with an inactive area;
a color filter under the thin film transistor;
a polarizer coupled to the thin film transistor, the thin film transistor coupled over the color filter;
a black matrix disposed between the thin film transistor and the color filter in the inactive area includes a patterned opening that allows visible light to pass through, wherein the patterned opening is along the inactive area of the perimeter, and wherein the patterned opening is used as a reference mark; and an infrared pass filter disposed between the color filter and the thin film transistor, wherein the infrared pass filter allows infrared illumination to pass through.

17. The display panel of claim 16 wherein the infrared pass filter is disposed under the thin film transistor.

18. The display panel of claim 16, wherein the infrared pass filter is disposed between the color filter and the thin film transistor.

19. The display panel of claim 16, wherein the infrared pass filter can hide an infrared marker from a naked eye by eliminating reflective and transmissive light.

20. The display panel of claim 16, wherein the display panel has an edge-to-edge configuration.

\* \* \* \* \*